United States Patent [19]
Hille et al.

[11] Patent Number: 5,977,258
[45] Date of Patent: Nov. 2, 1999

[54] MICROGEL

[75] Inventors: Hans-Dieter Hille, Bergisch Gladbach; Stephan Neis, Pulheim; Horst Müller, Köln, all of Germany

[73] Assignee: Bollig & Kemper KG, Germany

[21] Appl. No.: 08/875,858

[22] PCT Filed: Jan. 19, 1996

[86] PCT No.: PCT/DE96/00067

§ 371 Date: Nov. 21, 1997

§ 102(e) Date: Nov. 21, 1997

[87] PCT Pub. No.: WO96/24619

PCT Pub. Date: Aug. 15, 1996

[30] Foreign Application Priority Data

Feb. 7, 1995 [DE] Germany .................. 195 04 015

[51] Int. Cl.$^6$ ................ C08F 8/00; C08J 3/00; C08K 3/20; C08L 67/06
[52] U.S. Cl. .................. 525/170; 524/306; 524/457
[58] Field of Search .............. 525/170; 524/457, 524/306

[56] References Cited

U.S. PATENT DOCUMENTS 4,090,991  5/1978  Fukusaki et al. .................. 260/23 EM
4,563,372  1/1986  Kurauchi et al. ........................ 427/409

*Primary Examiner*—Patrick D. Niland
*Attorney, Agent, or Firm*—Vorys Sater Seymour and Pease, LLP

[57] ABSTRACT

A microgel obtained by polymerizing in aqueous phase a monomer blend comprising at least one ethylenic monofunctional compound, selected from the group consisting of vinylic compounds, alkyl esters of acrylic or methacrylic acid, hydroxyalkyl (meth)acrylates and vinyl acetate, and at least one ethylenic di- or multifunctional compound, selected from the group consisting of diacrylates, triacrylates and/or (meth)acrylates of polyfunctional alcohols, in the presence of a polycondensation product of a polycarboxylic acid, polyhydroxycarboxylic acid, hydroxypolycarboxylic acid and/or polyhydroxypolycarboxylic acid with a polyol, and its use for aqueous or solvent-containing coating compositions, in particular for aqueous or solvent-containing base coats, effect base coats or clear coat systems in the motorcar industry.

32 Claims, No Drawings

MICROGEL

The invention relates to a new kind of microgels, to a process of manufacturing the same and to their use.

Microgels are crosslinked polymeric microparticles in a liquid medium, said particles having an average particle diameter of from 0.01 to 10 µm and are produced by emulsion polymerisation of vinyl monomers with divinyl monomers in the presence of emulsifiers. Water-based microgels of the kind are used as rheology adjuvants or as auxiliary agents in the motorcar industry for producing a good metallic effect.

A main disadvantage of the so-obtained microgels consists in that the emulsifier remains in the finished microgel and, for example, because of the sulfur-containing groups (sulfonic acid groups), one has to put up with considerable disadvantages when using said microgels in a plurality of applications. Thus, in view of the emulsifier contained therein, these microgels have disadvantageous properties, for example in connection with their use in water-based coatings in the motorcar industry, in particular because of the humidity resistance.

Microgels obtained by emulsion polymerization can also be used after modification in conventional coatings, i.e. solvent-based coatings. To this end, it is necessary to convert the aqueous microgel into a solvent-containing form.

This is done by the coagulation process, which is often applied industrially, as described, for example, in WO-91/00895 and EP-A-029 637. To this end, n-butanol is added to the aqueous microgel dispersion resulting in a coagulation of the microgel. Thereafter, the lower phase, containing n-butanol, water and parts of the emulsifier, is separated and the upper phase, containing the microgel, n-butanol and residual water, is azeotropically -freed from residual water in vacuo by adding a solvent and/or a carrier resin solution. This method is disadvantageous in that the coagulation and thus the separation of the water does not, or unsatisfactorily, takes place if the solids content of the aqueous microgel dispersion is above 20% by weight. For this reason, great amounts of n-butanol-saturated water result which have to be adequately disposed at considerable expenditure.

Besides, significant amounts of emulsifier remain in the microgel present in the solvent-containing phase, which again entails the disadvantages indicated above.

The object of the invention is to provide, on the one hand, a microgel and, on the other hand, a process of manufacturing the same which does not exhibit the above-mentioned disadvantages.

This problem is solved according to the present invention by producing an emulsifier-free microgel comprising polymerizing in aqueous phase a monomer blend consisting of at least one ethylenic monofuntional compound and at least one ethylenic di- or multifunctional compound in the presence of a polyester.

The polyester functions here as carrier resin and, for example, as binder if the finished microgel is used in a base coat for the motorcar industry. Consequently, the microgel of the present invention does not contain any components (emulsifiers) which might impair a later use. An ethylenic mono-, di- or multifunctional compound includes all compounds which have one, two or several vinylic and/or allylic carbon-carbon double bond(s)).

In a particular embodiment of the present invention, the ethylenic monofunctional compound is selected from the group consisting of alkyl esters of acrylic and methacrylic acid, such as, e.g., methyl (meth)acrylate, ethyl (meth)acrylate, propyl (meth)acrylate, butyl (meth)acrylate, ethyl-hexyl (meth)acrylate, hydroxyethyl (meth)acrylate, hydroxypropyl (meth)acrylate, hydroxybutyl (meth)acrylate, hydroxyhexyl (meth)acrylate as well as isomers thereof; vinylic aromatic compounds, such as styrene, α-methylstyrene, vinyl toluene, vinyl naphthalene, vinyl ester, such as, e.g., vinyl acetate, vinyl ester of synthetic fatty acids, such as, e.g., VeoVa® 9, VeoVa® 10 of the Shell-Chemie company.

The expression "(meth)acrylic" as used in the following includes derivatives of acrylic and methacrylic acids.

In a further embodiment of the present invention, ethylenic di- or multifunctional compound stands for di- or tri(meth)acrylates of polyfunctional alcohols, such as ethylene glycol di(meth)acrylate, propylene glycol (meth)acrylate, butanediol di(meth)acrylate, hexanediol (di(meth)acrylate, trimethylolpropane tri(meth)acrylate; and/or allyl (meth)acrylate.

The polyester used in the present invention is a polykondensation product of at least one polyol and a polycarboxylic acid, hydroxycarboxylic acid, hydroxypolycarboxylic acid and/or polyhydroxypolycarboxylic acid.

In a particular embodiment of the invention, the polyol is selected from the group consisting of 1,6-hexanediol, neopentyl glycol, 1,4-dimethylolcyclohexane, hydroxypivalinic acid neopentyl glycol ester (HPN), perhydrogenated bisphenol-A, trimethylolpropane and/or trimethylolpropane monoallyl ether.

In a preferred embodiment of the invention, the polycarboxylic acid, hydroxycarboxylic acid, hydroxypolycarboxylic acid or polyhydroxypolycarboxylic acid are selected from the group consisting of adipic acid, phthalic acid, isophthalic acid, hexahydrophthalic acid, tetrahydrophthalic acid, trimellitic acid, dimethylolpropionic acid and their possible anhydrides; and/or dimeric fatty acids, such as Pripol® 1009 of the UNICHEMA company.

This polyester can have an average molecular weight of from 500 to 10,000, preferably from 700 to 5,000, in particular from 750 to 2,000 (g/mol); an acid number of from 10 to 250, preferably from 25 to 200, in particular from 15 to 180 (mg KOH/g of resin); and a OH number of from 20 to 250, preferably from 30 to 200 (mg KOH/g of resin).

In particular, the polyester does not contain any sulfur-containing groups and is to be converted into a water-dilutable form according to conventional methods.

In a preferred embodiment, the polyester exhibits at least two carboxyl groups per molecule.

The thusly obtained microgel of the present invention can be used in particular for aqueous coating compositions.

A preferred application of the present invention is the use in aqueous base coats, in particular in effect base coats and clear coats for the coating or the final coating of motorcars.

The microgels of the present invention impart to these aqueous coating compositions excellent coating and excellent decorative properties which manifest themselves, for example, in the form of a pronounced metallic effect, a very good resistance to sagging (SCA—Sagging Control Agent), an absence of mottling, resistance to strike in of the clear coat, good covering of sanding marks and compliance with a usually demanded property of the motorcar industry, such as rendered, for example, in the FORD specification liability test according to B1 106-02 and the stone impact text according to B 1 157-04.

Thus, the microgels of the present invention can equally be used for manufacturing aqueous transparent varnishes, baked enamels for industrial applications as well as for house paints.

In order to obtain microgels in non-aqueous phase, the microgels of the present invention, which are present in the aqueous phase, must be freed of the water according to a particular embodiment of the present invention.

This can be done by any conventional method, for example, by spray drying, freeze drying or vaporization, if desired, under reduced pressure.

After total removal of water, the microgel of the present invention can be available as powder or resinous mass.

According to a preferred embodiment of the present invention, the aqueous phase microgel can be transferred into an organic solvent phase. This can be done by azeotropic distillation. One can proceed by continuously or discontinuously feeding the aqueous microgel dispersion at elevated temperature, if desired, under reduced pressure, into a reactor containing a carrier, i.e. a solvent or a mixture of solvents, at least one of which forming an azeotrope with water.

The reactor is provided with a suitable condenser and a water separator with reflux towards the reactor. After attaining the boiling temperature of the azeotrope, the gaseous azeotropic phase (i.e. carrier and water) rises in the condenser. There, the azeotrope condenses and runs into the water separator. A phase separation takes place between the carrier and the water in the separator. In a continuous azeotropic distillation, the carrier is again refluxed into the reactor so that only minor amounts of carrier must be employed. The water obtained from the water separator is free of organic components and can be used again for manufacturing the aqueous microgel dispersions of the present invention.

The carrier can be selected from the group consisting of xylene, butyl acetate, methylisobutyl ketone, methylamyl ketone, pentanol, hexanol or ethyl hexanol.

A main advantage is that after being transfered to the organic phase, the carier remains therein, which is an advantage for the use of solvent-containing coating compositions. In respect of the further use of these organic phase-microgels for the manufacture of solvent-containing coating compositions, the specified carriers are suitable solvents.

By virtue of the simultaneous recycling of the carrier and the produced water without any additional process steps, this method is characterized by an extraordinary degree of environmental compatibility since there are no by-products that have to be disposed of, in contrast to prior art processes which yield considerable amounts thereof.

In a preferred embodiment of the azeotropic distillation, the latter is conducted in such a manner that the aqueous microgel dispersion is fed into a mixture of a carrier and a high-boiling organic solvent. This high-boiling organic solvent inhibits an adherence of the microgel to the wall of the reactor during the transfer to the organic phase. The high-boiling solvent can be selected from the group consisting of glykol ester, such as butyl glycol acetate and/or butyl diglycol acetate. As in the case of the carrier, the high-boiling solvent can also be a conventional component of a solvent-containing coating composition.

The so-obtained microgel of the present invention can be used in particular for solvent-containing coating compositions.

A preferred application of the invention is the use in solvent-containing base coats, in particular effect base coats and clear coats for the coating or final coating of motorcars.

This organic phase-microgel of the present invention also imparts to these solvent-containing coating compositions an excellent coating behaviour and excellent decorative properties in the form of a pronounced metallic effect, a very good resistance to sagging (SCA—Sagging Control Agent), absence of mottling, resistance to strike in of the clear coat, good covering of sanding marks and compliance with a usually demanded property of the motorcar industry.

The microgels of the present invention can be equally used for manufacturing solvent-containing transparent varnishes, coil coating compositions, baked enamels for industrial applications and house paints.

Furthermore, the present invention claims methods of manufacturing the microgels according to the invention.

The method of manufacturing the aqueous phase-microgel of the present invention comprises polymerizing in aqueous phase a monomer blend consisting of at least one ethylenic monofunctional compound and an ethylenic di- or multifunctional compound in the presence of a polyester.

A further method of the present invention of manufacturing a microgel in organic solvent is characterized by the following process steps:

producing a microgel in aqueous phase according to the above-mentioned process, azeotropic distillation with a carrier, if desired, in the presence of one or several high-boiling solvents and under reduced pressure, recycling the separated carrier and the water.

This process of the present invention is particularly characterized by high economy and environmental compatibility.

EXAMPLE 1 (comparative example)
Preparation of Microgel with emulsifier according to EP-A-029 637 a) Preparation of an aqueous microgel dispersion:

1935 g deionized water and 22.8 g aerosol 501 (cyanamide), as emulsifier, are placed in thermo regulated jacketed vessel at 82° C. A stirred preemulsion consisting of 674 g deionized water, 33.3 g aerosol 501, 400 g hexanediol diacrylate, 80 g hydroxypropyl methacrylate and 319 g methyl methacrylate is added within 3 hours with stirring. Parallel hereto, an initiator solution consisting of 9.5 g ammonium-persulfate and 328 g deionized water are added dropwise within 4 hours. After the reaction, an aqueous microgel dispersion having a solids content of 20% is recovered.

b) Preparation of a non-aqueous microgel dispersion by coagulation:

736 g of the microgel dispersion prepared according to a) are allowed to react with 228 g n-butanol with stirring. After 4 hours, 2 phases are formed of which the lower phase, consisting of 640 g of n-butanol-saturated water, is discharged. The upper phase containing the microgel is reacted with 82 g of carrier resin in the form of a branched polyester, prepared from neopentyl glycol, trimethylolpropane and adipic acid (molar ration 7:2:8), having an acid number of 18 (50%-solution in butyl acetate) and 290 g butyl acetate. The residual water, the residual butanol and butyl acetate are azeotropically removed in vacuo at 70° C. One obtains a non-aqueous microgel dispersion having a solids content of 49% and a water content of 0.08% determined by Karl-Fischer titration.

c) Preparation of an aqueous metallic base coat by using the microgel of example 1a:

600 g of the aqueous microgel dispersion prepared according to 1a are adjusted to a pH value of 8.00 with dimethylethanolamine (DMEA), thereafter, processed with a mixture comprising 30 g of the polyester prepared according to example 3a, 6 g DMEA and 114 g completely desalted water, a blend of 35 g of a commercial acrylate thickening agent (Latekoll® D of the BASF company) and 55 g of completely desalted water, 19 g of a commercial melamine resin (Cymel® 327 of the Dyno Cyec company), 6 g dimethylethanolamine, 48 g of a commercial aluminium bronze, which has been mixed with 46 g butyl glycol, 21 g n-butanol and 310 g deionized water to form a paste, to yield a lacquer.

The thusly obtained water based paint has a spray viscosity of 45 s (DIN cup with a 4 mm nozzle according to DIN 53211, 23° C.), a solids content of 16% and a pH value of 8.00.

d) Preparation of a solvent containing effect base coat by using the microgel of example 1b):

97 parts by weight of a branched polyester resin, prepared from neopentyl glycol, trimethylolpropane, isophthalic acid and adipic acid (molar ratio 7:2:5:3), having an acid number of 19 (50%-solution in butyl acetate); 51 parts by weight of a 30%-solution of cellulose acetobutyrate (CAB) 321-01) in butyl acetate and 33.3 parts by weight of a 15%-solution of cellulose acetobutyrate (CAB 381-2) in butyl acetate; 32.4 parts by weight of a 60%-solution of an n-butanol-etherified melamine resin in butanol, 18.6 parts by weight of a 97%-hexamethoxymethyl melamine resin, an aluminium paste consisting of 24 parts by weight of a commercial aluminium bronze; 15% by weight xylene and 15 parts by weight butyl acetate; 71 parts by weight of a commercial 8%-wax dispersion and 7 parts by weight xylene, 7 parts by weight tetrahydronaphthalene 100 parts by weight butyl acetate, 32 parts by weight of the non-aqueous microgel dispersion of example 1b) and 29 parts by weight of butyl glycol acetate are processed to yield a lacquer.

The so-obtained base coat has a spray viscosity of 22 s (DIN cup with a 4 mm nozzle according to DIN 53211, 23° C.), a solids content of 19% by weight and is applied by spraying on commercial steel plates primed with a standard primar surfacer, having a film thickness of from 15 to 18 μm and after flash of for 3 minutes is subsequently provided with a commercial motorcar standard base coat (as taught in DE-OS 39 19 028, comparative example 1b) having a dry film thickness of from 40 μm to 45 μm and is baked for 25 minutes at 140° C.

EXAMPLE 2 a) Preparation of a polyester:

In a 2 liter four-necked flask with stirrer, packed column and thermoelement, 142 g 1,6hexanediol, 42 g neopentyl glycol, 322 g dimethylolpropionic acid, 409 g adipic acid and 59 g phthalic acid anhydride are melted at 130° C. and by progressively increasing the temperature from 130° C. to 200° C. within 6 hours, are subjected to a polycondensation until an acid number of 156 is obtained. The recovered polyester has an average molecular weight of 1081, an acid number of 156 and a OH number (mg KOH/g of resin) of 104.

b) Preparation of a microgel dispersion according to the invention:

605 g of deionized water, 253 g of the polyester prepared according to a) and 51 g dimethylethanol amine are mixed with a monomer blend consisting of 379 g butyl acrylate, 153 g methyl methacrylate, 89 g styrene, 38 g hydroxypropyl methacrylate and 29 g allyl methacrylate and placed in a stirrable metering device. This mixture is fed dropwise within 3 hours with stirring into a double-walled vessel thermo regulated to 82 wherein 600 g deionized water were placed. Parallel hereto, a solution of 2 g ammonium persulfate in 250 g deionized water is added as initiator, dropwise from a dropping funnel within 4 hours. A microgel dispersion having a solids content of 40% is recovered.

c) Preparation of a non-aqueous microgel dispersion according to the invention:

392 butyl acetate and 240 g butyl glycol acetate are placed in a heatable double-walled reactor, provided with stirrer, water separator, condenser and dropping funnel and heated to 80° C. 368 g of the aqueous microgel dispersion prepared according to b) are added dropwise under reduced pressure (500 mPa) within 4 hours. An azeotrope of butyl acetate and water continuously distils over. When the metering is terminated, a non-aqueous microgel dispersion having a solids content of 19% is recovered as well as 221 g of water from the water separator. The water content of the dispersion amounts to 0.06%, determined by Karl-Fischer titration.

d) Preparation of a solvent-containing effect base coat by using the microgel of example 2c of the present invention:

98 parts by weight of a branched polyester resin, prepared from neopentyl glycol, trimethylolpropane, isophthalic acid and adipic acid (molar ratio 7:2:5:3), having an acid number of 19,0.50% in butyl acetate, 51 parts by weight of a 30%-solution of cellulose acetobutyrate (CAB 321-0.1) in butyl acetate and 33.3 parts by weight of a 15%-solution of cellulose acetobutyrate (CAB 381-2) in butyl acetate, 32.4 parts by weight of a 60%-solution of an n-butanol-etherified melamine resin in butanol, 18.6 parts by weight of 97%-hexamethoxymethyl melamine resin, an aluminium paste comprising 24 parts by weight of a commercial aluminium bronze, 15 parts by weight xylene and 15 parts by weight butyl acetate; 71 parts by weight of a commercial 8%-wax dispersion as well as 7 parts by weight xylene, 7 parts by weight tetrahydronaphthalene, 100 parts by weight butyl acetate, 82 parts by weight of the non-aqueous microgel dispersion according to example 2c) of the present invention and 29 parts by weight butyl glycol acetate are processed to yield a lacquer. The so-obtained base coat has a spray viscosity of 22 s (DIN cup with 4 mm nozzle according to DIN 53211, 23° C.), a solids content of 19% by weight and is applied by spraying on commercial steel plates that are primed with a commercial primar surfacher with a layer thickness being from 15 to 18 μm, and after flash of for 3 minutes is subsequently provided, with a conventional standard clear coat (from DE-OS 39 19 028, comparative example 1b) having a dry layer thickness of from 40 μm to 45 μm and is baked for 25 minutes at 140° C.

EXAMPLE 3 a) Preparation of a polyester:

104 g trimethylolpropane monoallyl ether, 448 g Pripol® 1009 (commercial product of the UNICHEMA company), 322 g dimethylolpropionic acid and 308 g hexahydrophthalic acid anhydride are weighed and placed in a reactor provided with stirrer and packed column and are heated to such an extent that the column head temperature does not exceed 100° C. The maximum esterification temperature amounts to 200° C. Cooling is effected at an acid number of 121.

A polyester having a calculated average molecular weight of 5590 and a hydroxyl number of 20 is recovered.

b) Preparation of an aqueous microgel dispersion according to the present invention:

1050 g of deionized water are weighed and placed in a 4 l reactor provided with a stirrer, reflux condenser and 2 dropping funnels. In one of the dropping funnels, a preemulsion, consisting of 750 g deionized water, 20 g dimethylethanol amine, 103 g heated polyester of example 3a, 183 g butyl acrylate, 91 g methyl methacrylate, 36 g styrene, 19 g hydroxypropyl methacrylate and 83 g allyl methacrylate, is weighed and blended. In the other dropping funnel, the initiator solution, consisting of 1.2 g ammonium persulfate and 240 g deionized water, is weighed and blended. After heating the contents of the reactor to 82° C., 10% of the preemulsion and 10% of the initiator solution are added one after the other. Following the exothermic reaction, the remaining 90% of the preemulsion are added within 3 hours and the remaining 90% of the initiator solution are added simultaneously within a period of 3.5 hours. The polymerisation temperature is maintained at 83° C. After termination of the feeding procedures, stirring is continued for another 1.5 hours at a temperature of 85° C.

The yield is a microgel dispersion having a solids content of 21% and a pH value of 7.40. The polymer has an acid number of 24 and a hydroxyl number of 18.

c) Preparation of an aqueous metallic base coat 775 g of the aqueous microgel dispersion of example 3b, a blend consisting of 38 g of a commercial acrylate thickening agent (Latekoll® D of the BASF company) and 60 g of completely desalted water, 21 g of a commercial melamine resin (Cymel® 327 of the Dyno Cytec company), 6 g dimethylethanol amine, 52 g of a commercial aluminium bronze, preprocessed to form a paste in 50 g butyl glycol and 23 g n-butanol and 430 g deionized water are processed to yield a lacquer.

The so-obtained water based paint has a spray viscosity of 45 s (DIN cup with 4 mm nozzle according to DIN 53211, 23° C.), a solids content of 16% and a pH value of 8.00.

EXAMPLE 4 a) Preparation of a polyester:

In a 2 l reactor provided with stirrer and packed column, 26 g neopentyl glycol, 560 g Pripol® 1009, 335 g dimethylolpropionic acid and 154 g hexahydrophthalic acid anhydride are weighed and heated in such a manner that the head temperature of the column does not exceed 100° C. The maximum esterification temperature amounts to 190° C. Cooling is conducted at an acid number of 124.

The yield is a polyester having a calculated average molecular weight of 2030 and a hydroxyl number of 69.

b) Preparation of an aqueous microgel dispersion according to the invention:

In a 4 l reactor provided with stirrer, reflux condenser and 2 dropping funnels, 1300 g deionized water are weighed. In one of the two dropping funnels, a preemulsion, consisting of 875 g deionized water, 51 g dimethylethanol amine, 258 g polyester of example 4a, 199 g butyl acrylate, 99 g methyl methacrylate, 40 g styrene, 358 g hydroxypropyl methacrylate and 77 g allyl methacrylate, is weighed and blended. In the other dropping funnel, the initiator solution, consisting of 2.4 g ammonium persulfate and 220 g deionized water, is weighed and blended.

Otherwise, the procedure is the same as that used for the preparation of the aqueous microgel dispersion 3b.

The yield is a microgel dispersion having a solids content of 30% and a pH value of 7.35. The polymer has an acid number of 31 and a hydroxyl number of 152.

c) Preparation of an aqueous metallic base coat:

383 g of the aqueous microgel dispersion of example 4b, a blend of 22 g of a commercial acrylate thickening agent (Latekoll® D of the BASF company), and 80 g completely desalted water, 14 g of a commercial melamine resin (Cymel® 327 of the Dyno Cytec company), 5 g dimethylethanol amine, 36 g of a commercial aluminium bronze preprocessed to form a paste in 35 g butyl glycol and 16 g n-butanol and 390 g deionized water are processed to for a lacquer.

The so-obtained water based paint has a spray viscosity of 45 s (DIN cup with 4 mm nozzle according to DIN 53211, 23° C.), a solids proportion of 16% and a pH value of 8.20.

EXAMPLE 5 a) Preparation of an unsaturated polyester:

In a 2 liters 4-necked flask provided with stirrer, packed column and thermoelement, 348 g trimethylolpropane monoally ether, 584 g adipic acid and 402 g dimethylolpropionic acid are melted and polycondensation is conducted by gradually increasing the temperature from 130° C. to 200° C. within 4 hours until an acid number of 141 is obtained. The recovered polyester has an average molecular weight of 1190, an acid number of 141 and a OH number of 94.

b) Preparation of an aqueous microgel dispersion:

624 g of deionized water, 228 g of the polyester prepared in 5a and 55.7 g dimethylethanol amine are mixed with a monomer blend consisting of 307 g butyl methacrylate, 235 g styrene, 66 g butyl acrylate, 54 g hydroxypropyl methacrylate and 38 g allyl methacrylate and placed in a stirrable metering device. This mixture is added dropwise with stirring, within 3 hours, into a thermo regulated jacketed vessel wherein 650 g deionized water had been placed. Parallel hereto, a solution of 2 g ammonium persulfate in 360 g deionized water is added, as initiator, dropwise from a dropping funnel within a period of 4 hours. The yield is a microgel dispersion having a solids content of 36%. The acid number is 35.

c) Preparation of a non-aqueous microgel dispersion:

1100 g butyl acetate and 400 g butylglycol acetate are placed in a heatable double-walled vessel provided with stirrer, water separator, high performance condenser and dropping funnel and are heated to 80° C. 1000 g of the aqueous microgel dispersion prepared according to b) is added dropwise at reduced pressure (500 mPa) within a period of 4 hours. An azeotrope consisting of butyl acetate and water continuously distils over. After terminating the addition, a non-aqueous microgel dispersion having a solids content of 23% is recovered, together with 740 g water and 300 g butyl acetate from the water separator. The water content of the dispersion is 0.09%, determined by Karl-Fischer titration.

d) Preparation of solvent-containing metallic base coat:

98 parts by weight of a branched polyester resin, prepared from neopentyl glycol, trimethylolpropane, isophthalic acid and adipic acid (molar ratio 7:2:5:3), having an acid number of 19 (50%-solution in butyl acetat), 51 parts by weight of a 30%-solution of cellulose acetobutyrate (CAB 321-0.1) in butyl acetate, 32.4 parts by weight of a 60%-solution of an n-butanol-etherified melamine resin in butanol, 18.6 parts by weight of 97%-hexamethoxymethyl melamine resin, an aluminium paste, consisting of 24 parts by weight of a commercial aluminium bronze, 15 parts by weight xylene, 7 parts by weight tetrahydronaphthalene, 86 parts by weight butyl acetate, 68 parts by weight of the non-aqueous microgel dispersion of example 5c of the present invention and 29 parts by weight butyl glycol acetate are processed to yield a lacquer.

The obtained base coat has a spray viscosity of 22 s (DIN cup with 4 mm nozzle according to DIN 53211, 23° C.) and a solids content of 19% by weight.

Application; examination of the water immersion test and the stone impact according to the test standards of the motorcar industry The base coats of examples 1 to 5 are applied by spraying on commercial steel plates, primed with a standard primar surfacer, said base coats having a layer thickness of from 15 to 18 μm, in an air-conditioned spray booth and after a flash of time of 5 minutes, are provided with a conventional standard clear coat having a dry film thickness of from 40 to 45 μm and are baked at 140° C. for 25 minutes. Comparative example 1.c does not show any metallic effect. In all other examples one obtains a uniform paint layer free of mottling with high gloss and a brilliant metallic effect.

The water immersion test was determined according to the FORD specification B1 104-1; 240 hours at 32° C.; rating m 0 to m 5 for the bubble frequency; g 0 to g 5 for the size of the bubbles.

The assessment of the behaviour towards stone impact was conducted according to the FORD specification B1 157-4; comparison with photographs of damages; (rating 0 to 7).

The results of the tests are summarized in the following table:

TABLE

| Example | Water Resistance | | | | Stone Impact Behaviour | |
|---|---|---|---|---|---|---|
| | m | g | Result | Assessment | Rating | Assessment |
| 1c (comparison, aqueous) | 2–3 | 2 | structure | pure | R2 | o.k. |
| 1d (comparison, conventional) | 2–3 | 2 | structure | pure | R2 | o.k. |
| 2d | 0 | 0 | none | o.k. | R2 | o.k. |
| 3c | 0 | 0 | none | o.k. | R2 | o.k. |
| 4c | 0 | 0 | none | o.k. | R2 | o.k. |
| 5d | 0 | 0 | none | o.k. | R2 | o.k. |

We claim:

1. A microgel prepared by polymerization in an aqueous phase of a monomer blend comprising at least one ethylenic monofunctional compound, selected from the group consisting of vinylic compounds, alkyl esters of acrylic and methacrylic acid, hydroxyalkyl (meth)acrylates and vinyl acetate and at least one ethylenic di- or multifunctional compound selected from the group consisting of diacrylate, triacrylate and/or (meth)acrylic acid esters of polyfunctional alcohols, in the presence of a polyester which is a polycondensation product of a polycarboxylic acid, polyhydroxycarboxylic acid, hydroxypolycarboxylic acid or polyhydroxypolycarboxylic acid with a polyol, wherein said polycondensation product has no sulfur containing group.

2. A microgel of claim 1, characterized in that the ethylenic monofunctional compound is styrene, butyl acrylate, methyl methacrylate or hydroxypropyl methacrylate.

3. A microgel of claim 1, characterized in that the ethylenic di- or multifunctional compound is allyl (meth)acrylate, hexanediol diacrylate, ethylene glycol diacrylate, or trimethylolpropane triacrylate.

4. A microgel of claim 1, characterized in that the polycarboxylic acid, polyhydroxycarboxylic acid, hydroxypolycarboxylic acid, and polyhydroxypolycarboxylic acid are selected from the group consisting of adipic acid, phthalic acid, isophthalic acid, hexahydrophthalic acid, tetrahydrophthalic acid, trimellitic acid, dimethylolpropionic acid, and their anhydrides, and dimeric fatty acids.

5. A microgel of claim 1, characterized in that the polyol is selected from the group consisting of hexanediol, neopentyl glycol, 1,4-dimethylolcyclohexane, hydroxypivalic acid neopentyl glycol ester (HPN), perhydrogenated bisphenol A, trimethylolpropane and trimethylolpropane monoallyl ether.

6. A microgel of claim 1, characterized in that the polyester has an average molecular weight of from 500 to 10,000.

7. A microgel of claim 1, characterized in that each polyester molecule exhibits at least 2 carboxylic groups.

8. A microgel of claim 1, characterized in that the microgel is additionally converted into an anhydrous form.

9. A microgel of claim 8, characterized in that said microgel is converted into an anhydrous form by dehydration.

10. A microgel of claim 1 characterized in that said microgel is converted into a liquid organic phase.

11. A microgel of claim 10 characterized in that said microgel is converted into an organic phase by azeotropic distillation.

12. A microgel of claim 11, characterized in that the azeotropic distillation is conducted with a carrier in the presence of at least one high boiling solvent.

13. A microgel of claim 12, characterized in that the carrier is butyl acetate, xylene, pentanol, hexanol, ethylhexanol, butyl acetate, methylisobutyl ketone or methylamyl ketone.

14. A microgel of claim 12, characterized in that the high boiling solvent is butyl glycol acetate or butyl diglycol acetate.

15. A method of manufacturing an aqueous-phase microgel, characterized by polymerizing in aqueous phase a monomer blend comprising at least one ethylenic monofunctional compound, selected from the group consisting of vinylic compounds, alkyl esters of acrylic or methacrylic acid, hydroxyalkyl (meth)acrylates and vinyl acetate; and at least one ethylenic di- or multifunctional compound, selected from the group consisting of diacrylate, triacrylate and (meth)acrylic acid esters of polyfunctional alcohols, in the presence of a polycondensation product of a polycarboxylic acid, polyhydroxycarboxylic acid, hydroxypolycarboxylic acid or polyhydroxypolycarboxylic acid with a polyol.

16. A method of manufacturing a microgel present in an organic solvent, characterized by the following process steps:
  1) preparation of a microgel present in an aqueous phase according to claim 15,
  2) azeotropic distillation with a carrier, whereby water from said aqueous phase and said carrier are separated from said microgel, and
  3) recycling the separated carrier and the separated water.

17. An aqueous or solvent-containing coating composition containing a microgel of claim 1.

18. A coating composition of claim 17, wherein said coating composition is an aqueous base coat, effect base coat, or clear coat.

19. A coating composition of claim 17, wherein said coating composition is a solvent-containing base coat, effect base coat, or clear coat.

20. A microgel of claim 6, characterized in that the polyester has an average molecular weight of from 700 to 5000.

21. A microgel of claim 20, characterized in that the polyester has an average molecular weight of from 750 to 2000.

22. A microgel of claim 6, characterized in that the polyester has an acid number of from 10 to 250.

23. A microgel of claim 22, characterized in that the polyester has an acid number of from 25 to 200.

24. A microgel of claim 22, characterized in that the polyester has an acid number of from 50 to 180.

25. A microgel of claim 6, characterized in that the polyester has a OH number of from 20 to 250.

26. A microgel of claim 25, characterized in that the polyester has a OH number of from 30 to 200.

27. A microgel of claim 9, characterized in that said dehydration is conducted by spray drying, freeze drying or vaporization.

28. A microgel of claim 9, characterized in that said dehydration is conducted under reduced pressure.

29. A microgel of claim 11, characterized in that said azeotropic distillation is continuous azeotropic distillation.

30. A microgel of claim 12, characterized in that said azeotropic distillation is conducted under reduced pressure.

31. A method according to claim 16, characterized in that said azeotropic distillation is conducted in the presence of at least one high boiling solvent.

32. A method according to claim 16, characterized in that said azeotropic distillation is conducted under reduced pressure.

* * * * *

Disclaimer

5,977,258 — Hans Dieter Hille, Bergisch Gladbach (DE); Stephan Neis, Pulheim (DE); and Horst Müller, Kölln (DE). MICROGEL. Patent dated November 2, 1999. Disclaimer filed October 30, 2013, by the inventors.

Hereby disclaims complete claims 1-32 of said patent.

*(Official Gazette, April 7, 2015)*